United States Patent [19]
Wadlington

[11] 3,859,586
[45] Jan. 7, 1975

[54] OVERCURRENT PROTECTION CIRCUIT UTILIZING PEAK DETECTION CIRCUIT WITH VARIABLE DYNAMIC RESPONSE

[75] Inventor: James Carroll Wadlington, Summit, N.J.

[73] Assignee: Bell Telephone Laboratories, Incorporated, Murray Hill, Berkeley Heights, N.J.

[22] Filed: Sept. 26, 1973

[21] Appl. No.: 400,785

[52] U.S. Cl. .................................................. 321/18
[51] Int. Cl. ............................................ H02m 3/32
[58] Field of Search .................... 321/2, 11, 18, 19

[56] References Cited
UNITED STATES PATENTS

| | | | |
|---|---|---|---|
| 3,320,511 | 5/1967 | Tiemann | 321/18 X |
| 3,402,342 | 9/1968 | Wagner | 321/2 X |
| 3,413,538 | 11/1968 | Hodges | 321/18 X |
| 3,480,852 | 11/1969 | Hung | 321/19 X |
| 3,660,750 | 5/1972 | Businelli | 321/2 |
| 3,701,937 | 10/1972 | Combs | 321/2 |
| 3,710,229 | 1/1973 | Jessee | 321/9 A |
| 3,735,235 | 5/1973 | Hamilton et al. | 321/2 |
| 3,789,288 | 1/1974 | Assow et al. | 321/2 |

Primary Examiner—R. N. Envall, Jr.
Attorney, Agent, or Firm—A. G. Steinmetz

[57] ABSTRACT

A DC to DC converter includes voltage regulation, overcurrent limit and symmetry correction circuitry. The converter includes a pulse-width modulation control including a timing circuit. The regulator, overcurrent limit, and symmetry correction circuitry all modify the timing therein to control the duty cycle of the converter switching devices. The overcurrent limit circuitry includes a variable response peak detection circuit to improve its response and feedback stability.

7 Claims, 5 Drawing Figures

OVERCURRENT PROTECTION CIRCUIT UTILIZING PEAK DETECTION CIRCUIT WITH VARIABLE DYNAMIC RESPONSE

BACKGROUND OF THE INVENTION

1. Field of the Invention

This invention relates to power supplies and overcurrent protection in DC to DC converters utilizing a peak current type detection arrangement. It is more specifically concerned with the dynamics of the response of the peak current detector and stability of the overcurrent protection circuitry.

2. Prior Art

The prior art overcurrent circuits utilized in power supplies tend to be a compromise between a fast, instantaneous response to a peak current overload and a slower response based on the detection of an average of the current overload. A slow protection response based on an average of the current overload has the advantage of stability of operation. However, the slow stable response does not permit immediate protective reactions to transient overcurrents which may damage the circuit devices. Peak detector type overcurrent protection circuits respond to instantaneous currents. However, conventional peak detectors generally have a slow time constant which dictates a slow response to detected peak currents.

A typical overcurrent protection circuit utilizing a peak detector is disclosed in U.S. Pat. No. 3,660,750 issued to P. Businelli on May 2, 1972. The protection circuit disclosed therein includes a current sensing resistor connected to the primary winding of the converter transformer. A peak detector is coupled thereacross and is responsive to the voltage drop across the sensing resistor. The peak voltage detected is doubled and stored on a storage capacitor. This stored peak voltage is applied to a comparator which controls the duty cycle of the converter's switching devices. Conventional peak detectors such as this, however, have a long time constant and hence a slow response to transient overloads. The dynamic response of the overcurrent protection circuitry is slow and sudden transient overloads may exist for a sufficient period of time to cause damage to the converter's switching transistors. The response of the peak detector could be speeded up by reducing the time constant of the peak detector circuit. However, this may introduce oscillatory instabilities into the overcurrent protection circuit.

It is therefore an object of the invention to improve the stability of an overcurrent limit protection circuit that is responsive to a detected peak primary current.

It is also an object of the invention to vary the dynamic response of the overcurrent protection circuit according to the nature of the overload.

It is yet another object to respond rapidly to large signal deviations and to limit the response to small signal deviations.

SUMMARY OF THE INVENTION

Therefore, in accordance with the invention, a DC to DC converter includes an overcurrent limit circuit having current sensing means on the primary side of the converter. This can protect against overload currents since the primary current will be proportional to the output load current. The sensed overload is utilized to control the response of a pulse-width modulation circuit to control the duty cycle of the switching devices of the converter. The voltage across the current sensing means on the primary side is applied to a peak detection circuit which is modified to have a fast or slow response according to the magnitude of the current overload. The time constant of the peak detection circuit is designed to permit a response that is at least faster than the time constant of the output filter of the converter. The response of this detection circuit, however, slows down if the overload is slight. Hence, the overcurrent limit circuit has a fast response to large overloads to provide maximum protection and a slow response to small overloads to insure maximum stability during steady state operation of the converter.

The peak detection circuit comprises a comparator circuit which is responsive to the detected primary current. The comparator controls the discharging of a charge storage capacitor. The discharge time of the capacitor is responsive to the peak primary current and is utilized to control the duty cycle of the switching devices of the converter. The discharge time constant during overload when the comparator is operative is rapid compared to the rate at which the inductor of the converter's output filter permits the output current to change. The discharge is fast in response to large current overloads and causes a fast reduction in the duty cycle of the converter switching devices. During slight overloads the storage capacitor is discharged only momentarily and hence the duty cycle is modified gradually. This overcurrent protection circuit advantageously is stable in operation and yet has a fast response to large overloads.

Another advantage of this circuit is that upon initial energization of the converter circuit the initial response of the overcurrent limit circuit restricts the duty cycle of the converter to some minimum value. Hence, the converter starts with a slow start characteristic, preventing an initial overshoot of the output voltage.

An added feature of the invention is protection to prevent saturation of the power transformer of the converter. This transformer may saturate due to unequal delays and voltage drops of the two oppositely phased switching transistors of the converter. The detected periodic current signals in the current sensing means are applied to a pulse-width modulation circuit. Dissymmetry in the current signals is corrected by making the periodic switching device driving pulses unequal to counteract the unbalance in the converter switching devices. The driving pulses are made unequal by modifying the timing slope of the pulse-width modulator in a manner proportional to the detected primary current.

Yet another feature of the invention is the capability of the overcurrent protection circuit to extend protection to multiple outputs by application of foldback techniques. In the case where the converter has more than one secondary winding output and the current is monitored from the primary side of the converter transformer, it is not normally possible to individually limit multiple output currents. In the case of multiple identical output windings, a short circuit at one of the multiple outputs can draw a current equal to the maximum total current for all the outputs combined. The current protection characteristics of the overcurrent limit circuit of the invention advantageously limits the maximum short-circuit current at any output to a value less than the maximum permitted at that one output by means of a foldback characteristic which reduces the total maximum current to less than the maximum current allowable at any one output.

BRIEF DESCRIPTION OF THE DRAWINGS

Many additional objects and features of the invention will become apparent upon consideration of the following detailed description of a specific overcurrent limit and symmetry correction circuit utilizing the principles of the invention. The following description is to be taken in conjunction with the drawings in which.

DETAILED DESCRIPTION

Figure 1:
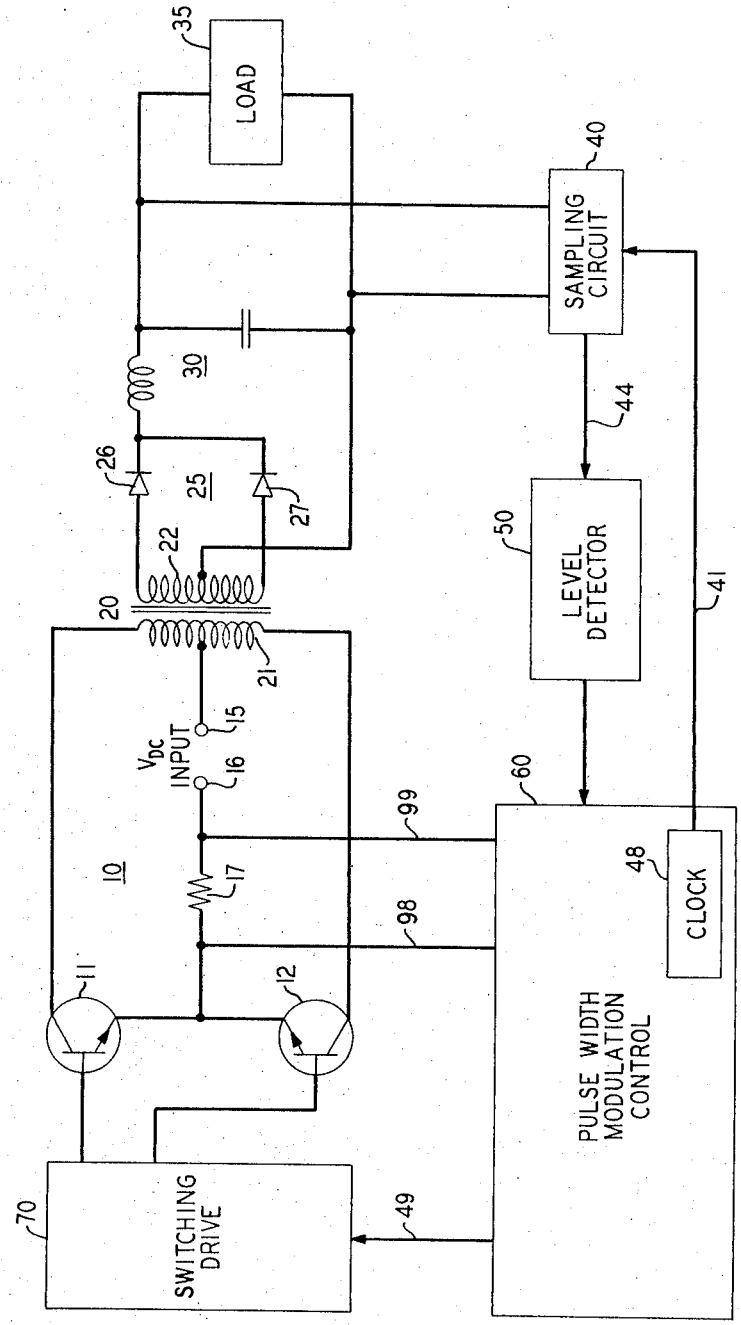
FIG. 1 is a schematic and block diagram of a DC to DC converter including overcurrent limit and symmetry correction circuits according to the principles of the invention.

The converter circuit, including the overcurrent limit protection and symmetry correction features of the invention, is shown in schematic and block diagram form in FIG. 1. FIG. 1 discloses an inverter circuit 10 including a power transformer 20 coupled to an energized load 35. A sampling circuit 40 monitors the output load signal and activates a level detector 50 which in turn controls a pulse-width modulation control circuit 60. The output of the pulse-width modulation circuit 60 is applied to a switching drive circuit 70 to control the switching of the switching devices in the inverter circuit 10.

The inverter circuit 10 includes two alternately phased switching transistors 11 and 12 which are common emitter coupled. The collectors of transistors 11 and 12 are connected to the opposite terminals of the primary winding 21 of the inverter power transformer 20. The DC input power is applied to the terminals 15 and 16. Terminal 15 is connected to the center tap of primary winding 21 of the power transformer 20 and the terminal 16 is coupled to the common emitter junction of the switching transistors 11 and 12 by a current sensing resistor 17. The output winding 22 of the transformer 20 is connected to a full-wave rectifier 25 comprising the rectifying diodes 26 and 27. The output of the rectifier 25 is coupled, via an output filter 30, to the output load 35. Since the operation of inverter circuits is well known, it is not believed necessary to describe its operation herein.

A sampling circuit 40 is connected across the output load 35 to monitor the output load voltage. The sampling frequency is determined by a clock 48 included within the pulse-width modulation control circuit 60. The output of the clock 48 is applied, via lead 41, to the sampling circuit 40. The output of the sampling circuit 40 is applied, via lead 44, to a level detector 50. The level detector 50 includes an internally generated reference signal and a comparator. The output signal of the sampling circuit 40 is compared by the comparator within the level detector with the reference signal and the resulting error signal is applied to the pulse-width modulation control circuit 60. The pulse-width modulation control circuit 60 includes a timing circuit which is responsive to the error signal. This timing circuit controls the duty cycle of a pulse signal generated therein.

The current sensing resistor 17 is included in the inverter 10 to permit monitoring of the current flow through the switching transistors 11 and 12 and the primary winding 21. Two leads 98 and 99 are connected to the opposite terminals of the current sensing resistor 17 and couple the voltage signal thereacross to the pulse-width modulation control 60. This voltage signal is utilized to modify the timing of the timing circuit therein and hence modify the duty cycle of the pulse output of the modulation control circuit 60 to the switching drive circuit 70 in order to provide overcurrent protection and symmetry correction. The manner in which this signal provides overcurrent protection and symmetry control is described in detail below with reference to FIG. 2.

The switching drive circuit 70 supplies drive signals to switch the transistors 11 and 12 conducting and nonconducting during alternate half-cycles. The pulse width of these drive signals is controlled by the pulse-width output of the pulse-width modulation control circuit 60.

Figure 2:
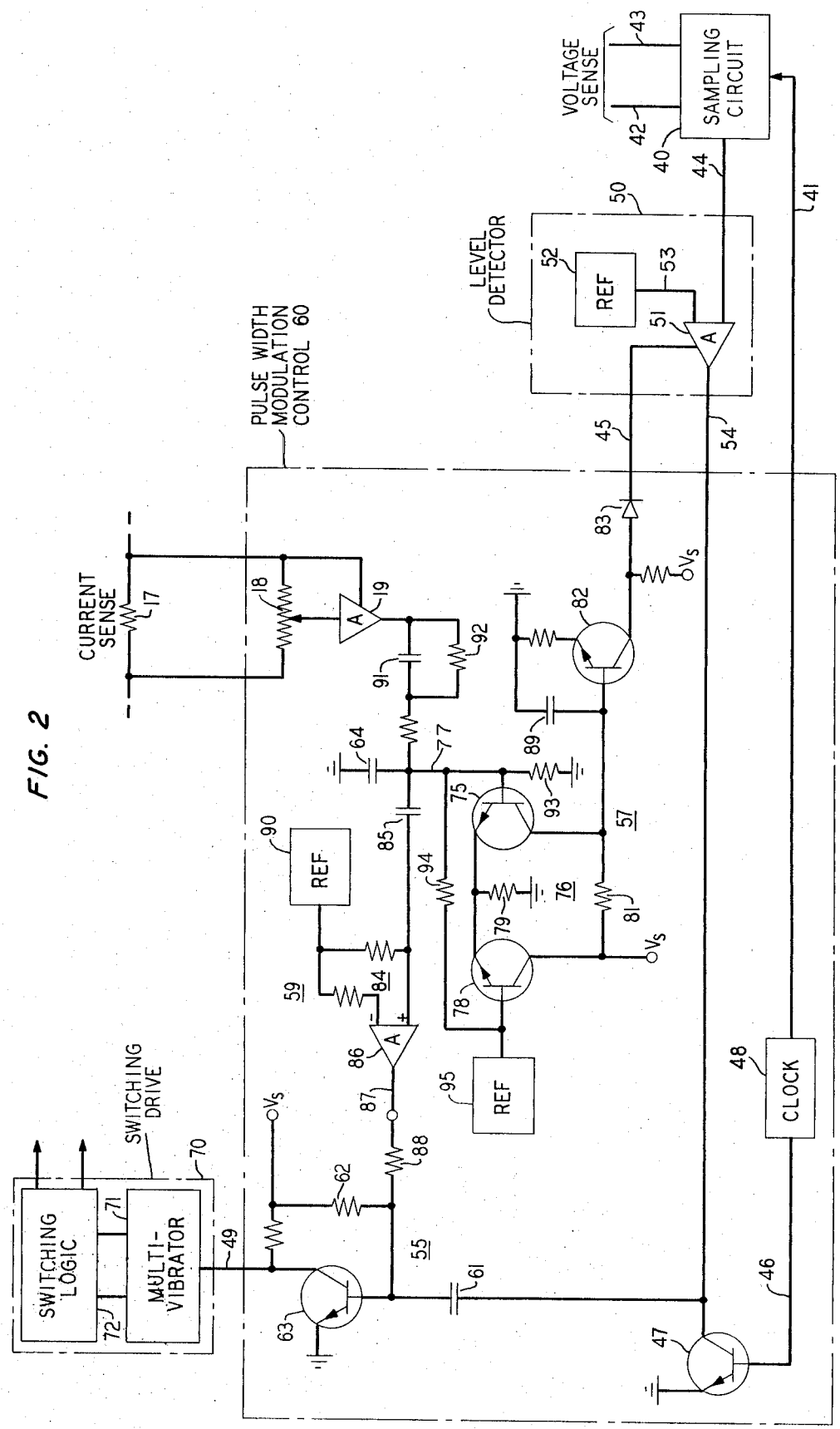
FIG. 2 is a detailed schematic and block diagram of the switching control circuitry including the overcurrent limit and symmetry correction circuits according to the principles of the invention.

FIG. 2 discloses in detail the switching control circuitry which controls the duty cycle of the switching devices of the inverter 10 shown in FIG. 1. This control circuitry provides voltage regulation circuitry to regulate the output voltage of the converter, overcurrent limit circuitry to prevent sustained overcurrent conditions, and symmetry correction circuitry to balance the conduction of the oppositely phased devices of the inverter circuit.

The voltage regulation portion of the switching control circuitry senses the output voltage of the converter, via leads 42 and 43, which are coupled to the two output terminals of the converter. Leads 42 and 43 couple the output voltage to the sampling circuit 40. The sampling circuit 40 periodically samples the output voltage of the converter in response to the periodic clock pulses applied to it by a clock 48, via lead 41. This output voltage sampled is periodically applied, via lead 44, to the error amplifier 51 included in the level detector 50. A reference voltage source 52 is coupled, via lead 53, to the other input of the error amplifier 51. The output error voltage signal of the error amplifier 51 is proportional to the deviation of the output voltage of the converter from its regulated value. This output error voltage is applied, via lead 54, to the pulse-width modulation control circuit 60.

The pulse-width modulation control circuit 60 comprises a timing circuit 55, an overcurrent limit circuit 57, and a symmetry control circuit 59. The timing circuit 55 responds to the error output voltage signal of the error amplifier 51 to generate a pulse-width modulated pulse which controls the switching drive circuit 70. The error signal output of the error amplifier 51 is applied, via lead 54, to a charge storage capacitor 61. Capacitor 61 is also charged by the outputs of the overcurrent limit circuit 57 and the symmetry control 59 as described hereinbelow. For the present, only the voltage regulation signal applied by the error amplifier 51 will be discussed.

The transistor 47 of the timing circuit 55 is normally biased in a conducting state. The collector-emitter path of the transistor 47 is a discharge path for the capacitor 61 and normally keeps capacitor 61 discharged. The negative periodic output pulse signal of the clock 48 is applied to the base of transistor 47, via lead 46. This pulse signal periodically biases the transistor 47 nonconducting permitting the output of the error amplifier 51 and other inputs to periodically charge the capacitor 61. The capacitor 61 is in turn coupled to the base of the transistor 63. The collector of the transistor 63 is connected, via lead 49, to the switching drive circuit 70. The conductivity state of the transistor 63 is controlled by the charge on the capacitor 61. When the transistor 47 is in its conducting state and the capacitor 61 is being discharged, the transistor 63 is biased nonconducting and the output on lead 49 is a positive signal.

When the clock 48 activates the sampling circuit 40, it also supplies a negative output pulse on lead 46 to bias the transistor 47 nonconducting. This permits the error signal output of the error amplifier 51 to charge the capacitor 61. The error signal charge on capacitor 61 is applied to the base of transistor 63. The transistor 63, in response to this error signal, is biased nonconducting. At the end of the clock pulse, the transistor 47 resumes its conducting state and discharges the capacitor 61. The transistor 63 remains nonconducting until the capacitor 61 discharges sufficiently to permit transistor 63 to be forward-biased into conduction. When transistor 63 again conducts, the signal on lead 49 drops to ground potential. This terminates the output pulse of the pulse-width control circuit 60. This width modulated output pulse is applied to the switching drive circuit 70.

The switching drive circuit 70 comprises a multivibrator circuit 71 and a switching logic circuit 72. The width modulated pulse signal on lead 49 controls the switching of the multivibrator 71 and hence the duty cycle of the output of the multivibrator. The switching logic circuit 72 modifies the pulse signal to supply a driving pulse having the proper signal characteristic to drive the switching devices of the inverter circuit. It is apparent from the foregoing description that the charge stored on the capacitor 61 controls the duty cycle of the output of the pulse-width modulation control 60 and hence the duty cycle of the converter switching devices.

The overcurrent limit circuitry 57 modifies the timing response of the timing circuit 55 to protect the converter against current overloads. The overcurrent limit circuit 57 operates to directly regulate the peak primary current in the inverter's switching devices and primary transformer winding. This peak primary current is sensed by monitoring the voltage across the current sense resistor 17. This voltage magnitude is directly proportional to the magnitude of the output current of the converter. The current limit circuit 57 advantageously has a variable response which depends upon the magnitude of the overload current detected. If the overload current is large in magnitude, the current limit circuit has a fast response to provide maximum protection. If the overload current is small in magnitude, the response of the current limit circuit is slow to insure stability in the steady state operation of the overcurrent limit protection circuitry.

The primary current of the inverter is monitored as described above to detect overloads by sensing the voltage across the current sensing resistor 17. The impedance of the current sensing resistor 17 is very low, producing sensing voltages in the millivoltage range. This sensed voltage is applied to a potentiometer 18. The output voltage of the potentiometer 18 is applied to a level shift amplifier 19. The level shift amplifier 19 increases the signal level of the overcurrent signal to a sufficient magnitude to operate the subsequent comparison and protection circuitry.

The output of the level shift amplifier 19 is applied via a DC blocking capacitor 91 and a filter capacitor 64 to a differential comparator amplifier 76. A resistor 92 shunts the capacitor 91. The parallel connected capacitor 91 and resistor 92 give the overcurrent protection a foldback characteristic to provide protection which limits the maximum short-circuit current of the converter even if it has multiple outputs. The signal output of the level shift amplifier has a waveform similar to waveform B in FIG. 3. The maximum current limit is shown by dotted line L in FIG. 3. When the monitored current exceeds this value, the overcurrent protection circuit is activated. The blocking capacitor 91 filters out the DC component of this current waveform and the overcurrent protection circuitry responds to the transmitted AC component of the current waveform. The resistor 92 determines the actual short-circuit current permitted as described hereinbelow.

The filter capacitor 64 is connected to the output of the level shift amplifier 19 in order to filter the leading edge spikes of the voltage signal corresponding to the overload current. This filtered voltage signal is applied to a differential comparator amplifier 76. The differential comparator amplifier 76 comprises the two emitter coupled transistors 75 and 78. The current sense voltage signal is applied, via lead 77, to the base of transistor 75. A reference voltage source 95 is connected to the base of transistor 78.

A resistor 94 connects lead 77 to the base of transistor 78 and the reference voltage source 95. A resistor 93 connects lead 77 to ground. The series connected resistors 93 and 94 function as a voltage divider in order to establish a fixed DC voltage operating level at the differential comparator amplifier 76 input lead 77.

The current sense signal voltage on lead 77 is compared with the reference voltage by the differential comparator amplifier 76. Should the current signal voltage exceed the reference signal voltage the transistor 75 is biased conducting. The conducting collector-emitter path of transistor 75 completes a signal path from capacitor 89 through resistor 79 to ground. This discharges the charge which is stored on the capacitor 89 through resistor 79 to ground.

The capacitor 89 is initially charged by the voltage source $V_s$ through resistor 81. This biases the inverter amplifier transistor 82 normally conducting. When an overcurrent signal biases the transistor 75 conducting, the capacitor 89 is discharged. The charge on the capacitor 89 is applied to an inverter amplifier comprising transistor 82. The transistor 82 inverts the decreasing signal voltage of the capacitor 89 and applies a positively increasing voltage, via the now forward-biased diode 83 and lead 45, to the error amplifier 51. This positive voltage turns off the output stage of the error amplifier 51 and reduces its output error signal. As the voltage on the capacitor 89 further decreases, an increasing positive voltage is applied through the diode 83 to reduce the output error voltage of the error amplifier 51 and hence reduce the amount of charge stored on capacitor 61. The decreased magnitude of the error signal decreases the pulse width of the pulse output of the pulse-width control 60. This limits the output current of the converter by reducing its output voltage once a specific output current threshold has been reached.

The voltage on the capacitor 89 is related to the peak current flow in the primary winding of the converter transformer and its discharge period is responsive to the magnitude of the overload current. The charging time constant of the capacitor 89 is much greater than the discharging time constant. During steady state operation of the converter when current overloads are very small, the output of the current limit circuit 57 on lead 45 acts much as an error signal. This output modifies the converter output voltage to limit the output current of the converter. However, during large signal deviations when the output current greatly exceeds the current limit threshold, the capacitor 89 is discharged for a long duration comprising most of the half-cycle switching period of the converter. This rapidly discharges the capacitor 89. The rapid discharge of the charge contained on capacitor 89 causes a fast reduction in the duty cycle of the pulse output of the timing circuit 55 and rapidly lowers the output voltage and current.

Two features of the overcurrent protection circuit are its soft start capability and its foldback characteristic permitting short-circuit current protection when the converter transformer has plural secondary output windings. When the converter circuit is initially energized, the capacitor 89 is in a discharged condition. In response to this discharged condition, the transistor 82 is nonconducting and hence, as described above, a positive voltage is applied, via lead 45, to the error amplifier 51. This positive signal limits the error signal output of amplifier 51 and hence limits the duty cycle of the output pulse of the pulse-width control circuit 60, thus permitting a soft start.

The foldback characteristic is controlled by the DC blocking capacitor 91 and the resistor 92 shunting it, and the voltage divider comprising resistors 93 and 94. The resistors 93 and 94 are connected in series and connect the reference voltage source 95 to ground with the junction of resistors 93 and 94 connected to the input terminal 77 of the differential comparator amplifier. The foldback can be controlled to achieve any desired short-circuit current. In the case of a converter with multiple outputs and having the current monitored on the primary side, the proper short-circuit current would be a current equal to the maximum permissible short-circuit current at the output with the least power capacity.

Due to the insertion of the DC blocking capacitor 91, the overcurrent limit circuit responds to the AC component of the primary current. The difference between the DC component and peak value of the primary current is maintained at a constant value by varying the duty cycle of the switching devices of the converter. Hence, as the duty cycle of the primary current pulse is reduced in response to an overload, both the peak current and DC current are reduced but a constant difference in magnitude is maintained between these two values. Hence due to this constant difference a foldback characteristic is introduced as the output voltage decreases. The magnitude of the foldback is controlled by the value of the resistor 92. The voltage divider comprising resistors 93 and 94 provide a fixed DC operating potential to the input of the differential comparator amplifier 76.

Figure 4:
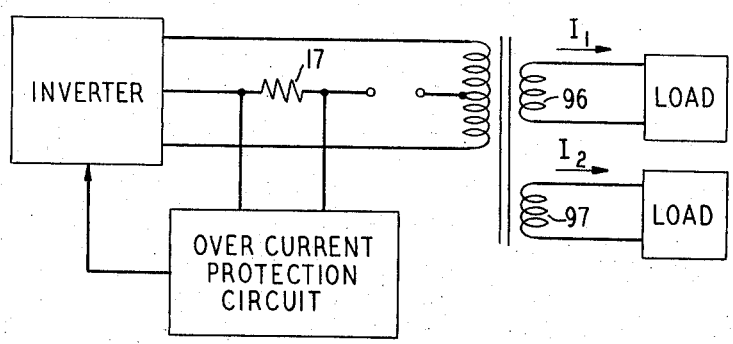
FIG. 4 is a block diagram of a DC to DC converter with multiple outputs.
Figure 5:
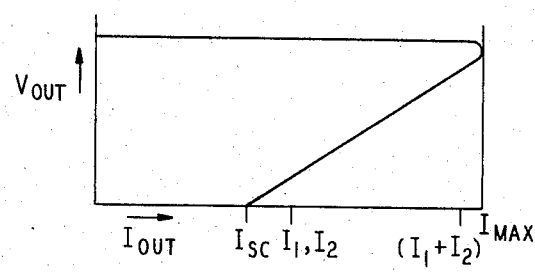
FIG. 5 is a current voltage waveform of the desired current protection characteristic for the circuit of FIG. 4.

A converter having multiple identical output windings and current protection monitoring the primary current is shown in block form in FIG. 4. The maximum current limit output of secondary winding 96 is a current $I_1$ and the maximum current limit output of secondary winding 97 is a current $I_2$. It is apparent that since the current limit is determined by monitoring the primary current through resistor 17, a short circuit at one of the outputs could draw a current much in excess of either current $I_1$ or $I_2$. The protection characteristic is shown by the current voltage waveform in FIG. 5. The foldback is arranged so that when a short-circuit current at the primary proportional to $I_{max}$ is detected, the total output current is reduced to a value less than $I_1$ or $I_2$, the maximum permissible current at one of the outputs.

Figure 3:
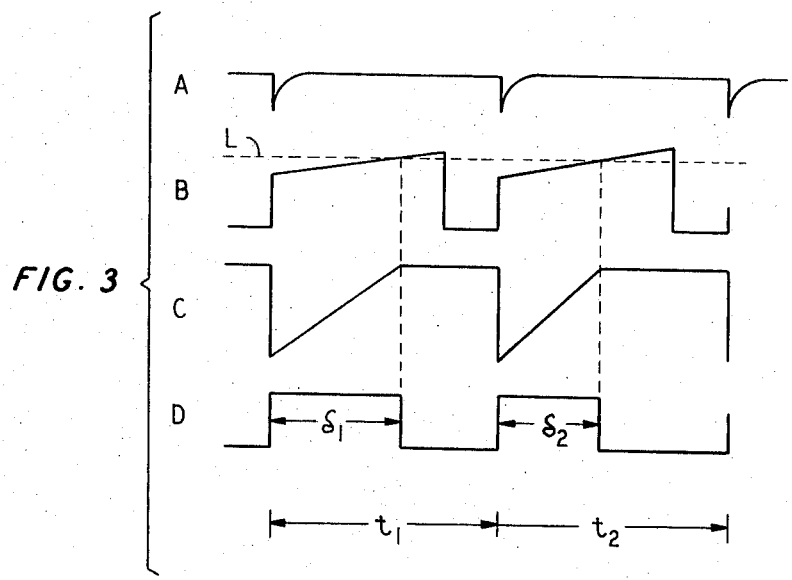
FIG. 3 discloses voltage waveforms to assist in explaining the operation of the symmetry correction circuitry.

The symmetry correction circuit 59 as shown in FIG. 2 utilizes the voltage signal detected across the current sensing resistor 17 to balance the current conduction through the alternately conducting switching devices of the converter. The primary current is balanced in response to symmetry correction signals. The balanced current prevents the core of the transformer 20, as shown in FIG. 1, from saturating and thereby causing excessive primary currents during one of the half-cycles of operation. The dissymmetry which leads to such saturation is due to unequal pulse durations and unequal voltage drops in the alternately phased switching transistors of the converter. A typical primary current waveform is shown in FIG. 3 (waveform B). The waveforms in FIG. 3 are shown synchronized with the pulse output of clock 48 (waveform A). This dissymmetry may be corrected by adjusting the output pulses of the timing circuit 55 (waveform D, FIG. 3). These pulses during alternate half-cycles are made unequal, as shown by waveform D, to counteract the unbalances of the switching devices in the inverter circuit. The unbalance in these switching devices is detected by monitoring the differences in the primary current detected in the current sensing transistor 17, as shown by waveform B in FIG. 3, during adjacent half-cycles of operation of the converter. The correction to the duty cycle of the switching is made by controlling the voltage slope of the charging of the capacitor 61 of the timing circuit directly proportional to the instantaneous primary current detected in the current sensing resistor 17. The adjacent half-cycles are shown by the designated time periods $t_1$ and $t_2$ in the waveforms in FIG. 3. A first conduction period is indicated during the time period $t_1$ during which time the primary current as shown by waveform B has a certain specified value. The charging waveform of the capacitor 61 is shown by waveform C in FIG. 3. If the primary current (waveform B) increases due to saturation in a half-cycle as shown during next successive time period $t_2$, the timing pulse width $\delta_2$ (waveform D) for that one half-cycle is reduced to a value less than the timing pulse width $\delta_1$ for the time period $t_1$. This time differential of $(\delta_1 - \delta_2)$ is caused by changing the charging rate of the capacitor 61 during the second successive time period.

The current signal output waveform of the level shift amplifier 19, shown by waveform B (FIG. 3), is identical to the primary current waveform. This signal waveform is applied, via a DC blocking capacitor 85, to a balance amplifier 86. The input circuit to the balance amplifier 86 includes a voltage divider 84 shunting its input terminals and a reference voltage source 90 connected to the center tap of the divider 84. The reference voltage provides a measuring reference to compare the current signal output of the level shift amplifier 19 with and to establish a basic signal level for the output of the balance amplifier 86. The output signal of the balance amplifier 86 is applied, via lead 87 and resistor 88, to the capacitor 61 of the timing circuit 55.

As described hereinabove, the transistor 47 is turned off periodically by the output pulses of the clock source 48, which are shown by waveform A in FIG. 3. During this time the capacitor 61 is charged to the error voltage output of the error amplifier 51, as shown by the waveform C. At the termination of the clock pulse, the transistor 47 becomes conducting and the capacitor 61 is discharged through the collector-emitter path of the transistor 47 to ground level and also through the resistor 62 to the voltage source $V_s$. The symmetry correction circuit applies an auxiliary discharge voltage through resistor 88 from the output of the balance amplifier 86 to balance the primary current during adjacent half-cycles. This alters the slope of the charging voltage of the capacitor 61 and hence modifies the time at which the transistor 63 becomes forward-biased.

The time at which transistor 63 becomes forward-biased controls the duty cycle of the pulse-width output of the timing circiut 55 and hence the duty cycle of the switching devices of the inverter circuit. This balancing function may be readily ascertained by examining the voltage waveforms disclosed in FIG. 3. The two time periods $t_1$ and $t_2$ represent adjacent half-cycles of operation of the converter's inverter circuit. The primary current as shown by waveform B during time $t_2$ exceeds the primary current during time $t_1$. Hence the slope of the charging voltage shown by waveform C is steepest during the time period $t_2$; hence, the duty cycle of the pulse output of the pulse-width modulator is reduced during time period $t_2$, as shown by waveform D, in order to restore the primary current balance. As is apparent from the foregoing description, this duty cycle is primarily responsive to the voltage regulation circuitry, the current limit circuitry, and is modified to maintain a current balance in response to the symmetry correction circuitry.

While a specific embodiment of the invention has been disclosed, many variants thereof will be readily apparent to those skilled in the art which are within the spirit and scope of the invention.

What is claimed is:

1. In a converter circuit,
voltage regulation means comprising means to generate voltage regulation signals proportional to the deviation of the output voltage of the converter from a regulated value,
means to monitor a current magnitude of said converter circuit and generate proportional voltage signals therefrom, an overcurrent limit protection circuit responding to said proportional voltage signals above an established threshold value and having a response speed dependent upon the magnitude of the voltage signals comprising, a comparator circuit, means to apply said proportional voltage signals to said comparator circuit, a source of reference voltage to establish said threshold value and being coupled to said comparator circuit, said comparator circuit being activated in response to said proportional voltage signals exceeding said established threshold value, a first charge storage capacitor, means to charge said first charge storage capacitor, means to discharge said first charge storage capacitor through said comparator when said comparator is activated, and means responsive to said first charge storage capacitor to generate current limit control signals, said means to generate current limit control signals being coupled to said means to generate voltage regulation signals and being utilized to modify said voltage regulation signals to limit said converter current.

2. In a converter circuit as defined in claim 1 wherein said voltage regulation means comprises,
a timing circuit including a second charge storage capacitor and a capacitor charging means responsive to said voltage regulation signals, said capacitor charging means primarily controlling the charging of said timing capacitor, said converter circuit further including at least two alternately switched switching devices, and said protection circuit further including symmetry control circuitry responsive to said voltage signals and including means to modify the charging rate of said second charge storage capacitor.

3. In a converter circuit as defined in claim 1 wherein, said comparator circuit comprises first and second transistors connected in a common emitter junction differential configuration, said mans to apply said proportional voltage signals being coupled to the base of said first transistor, and said source of reference voltage being coupled to the base of said second transsitor, and the collector emitter path of said first transistor coupling said first charge storage capacitor to ground and acting as a discharge path when said first transistor is rendered conductive by said voltage signals exceeding said established threshold value.

4. In a converter circuit as defined in claim 3 wherein, said means to monitor a current magnitude includes a DC blocking capacitor to separate the DC component of the signal monitored, and said protection circuit further including a voltage divider connected to said reference voltage and to the base of said first transistor whereby the voltage divider supplies a DC voltage level to the base of said first transistor.

5. In a converter circuit as defined in claim 3, said converter circuit further including an output filter, and wherein said first charge storage capacitor is discharged through a fixed resistor, the discharge time constant of the fixed resistor and said first charge storage capacitor being faster than the time constant of the output filter of said converter circuit.

6. A DC to DC converter comprisinng output means, switching means to drive said output means, and voltage regulation means comprising, means to control the pulse width of said switching means and including means to accept a source of reference voltage, voltage comparison means to compare the reference voltage with the voltage of said output means and generate an error signal therefrom, and means to monitor the current flow through said switching means including a current sensing resistor in series with said switching devices, wherein the improvement comprises, a switching comparison circuit responsive to said current sensing resistor, a charging circuit including a capacitive storage device whose charging and discharging is responsive to said switching comparison circuit, the time constant of said discharging circuit being small with respect to the time constant of said output means, and means responsive to the charge on said capacitive storage device to modify the error signal generated by said voltage comparison means whereby the error signal as modified is applied to said means to control to alter the pulse width of said switching means in order to limit current flow therethrough.

7. A DC to DC converter as defined in claim 6 wherein, said means to control the pulse width includes a timing circuit, and said improvement further comprising symmetry correction means to balance the current flow in said switching means, including balance amplifier means coupled to said sensing resistor to sense the current flow therein and a second capacitive storage device responsive to said balance amplifier means and included in said timing circuit, the output of said balance amplifier means altering the charging rate of said second capacitive storage device in response to said balance amplifier means in order to restore the balance of current flow in said switching means.

* * * * *